US005609686A

United States Patent [19]
Jerry et al.

[11] Patent Number: 5,609,686
[45] Date of Patent: Mar. 11, 1997

[54] FLEXIBLE ADJUSTABLE SMOOTHING BLADE

[75] Inventors: Glen A. Jerry, Lake Elmo; Stephan F. Kistler, Minneapolis; Joseph H. Lam, Woodbury, all of Minn.; Scott D. Stenstrom, Hudson, Wis.

[73] Assignee: Minnesota Mining and Manufacturing Company, St. Paul, Minn.

[21] Appl. No.: 521,404

[22] Filed: Aug. 30, 1995

[51] Int. Cl.$^6$ .......................... B05C 11/02; B05C 11/04
[52] U.S. Cl. ........................ 118/123; 427/130; 427/356; 427/359; 427/361
[58] Field of Search ..................... 427/130, 356, 427/359, 361; 118/110, 118, 112, 123

[56] References Cited

U.S. PATENT DOCUMENTS

| | | | |
|---|---|---|---|
| 3,761,311 | 9/1973 | Perrington et al. | |
| 4,133,917 | 1/1979 | Wallsten | 427/361 |
| 4,282,826 | 8/1981 | Wohlfeil | 118/118 |
| 4,547,393 | 10/1985 | Asai et al. | |
| 4,870,920 | 10/1989 | Kageyama et al. | |
| 4,995,339 | 2/1991 | Tobisawa et al. | |
| 5,042,442 | 8/1991 | Laskaris et al. | |
| 5,397,601 | 3/1995 | Korhonen | 427/361 |
| 5,409,732 | 4/1995 | Leonard et al. | 427/359 |
| 5,423,128 | 9/1995 | Kustermann et al. | 118/123 |
| 5,447,747 | 9/1995 | Munter et al. | 427/130 |
| 5,449,525 | 9/1995 | Lundberg et al. | 118/123 |

FOREIGN PATENT DOCUMENTS

| | | |
|---|---|---|
| 50-22835 | 3/1975 | Japan. |
| 54-8646 | 1/1979 | Japan. |
| 60-57387 | 12/1985 | Japan. |

OTHER PUBLICATIONS

David R. Roisum, "The mechanics of web spreading: Part 1", vol. 76, No. 10, Tappi Journal, pp. 63–85.

Primary Examiner—Katherine Bareford
Attorney, Agent, or Firm—Carolyn A. Bates; William D. Bauer

[57] ABSTRACT

An apparatus continuously smoothes a wet coating of magnetizable particles and binder on a moving flexible web. A first longitudinal end of a flexible film is held in contact with the wet coating on the substrate and is free to drag against the wet coating. The first longitudinal end is deflected toward the substrate along a line extending transversely between the first and second transverse ends. The amount of deflection is adjusted and varied during coating to adjust the radius of curvature of the deflection of the first longitudinal end. A smoothing bar or a cylindrical rod, with or without a sharp edge, can hold the flexible film in position. The deflection and adjustment can be performed by a screw. Alternatively, a cylindrical rod is used by itself.

14 Claims, 6 Drawing Sheets

FLEXIBLE ADJUSTABLE SMOOTHING BLADE

FIELD OF THE INVENTION

The invention is related to systems for making magnetic recording media using gravure coating to apply magnetizable layers and backside coatings. More particularly, the invention is related to systems for smoothing gravure and other patterned coatings.

BACKGROUND OF THE INVENTION

The magnetizable layers of most magnetic recording media consist of coatings of fine magnetizable particles in organic binder. The magnetizable particles typically have a maximum dimension of less than 1 μm. A magnetizable coating should be of uniform thickness, typically less than 1.0 mil (25 μm), and should be free from defects such as pinholes, streaks, and particle agglomerates. The coatings can be applied by a direct gravure coater as illustrated in U.S. Pat. No. 3,761,311. This patent shows that before significant evaporation of the coating on a backing member, the knurl pattern on the coating (from the gravure cylinder) is smoothed out by a flexible blade, known as a drag smoother. This patent does not explain the smoothing operation of the flexible blade or give any information as to its construction.

With conventional, straight-edged smoothers, removing gravure patterns on thin coated substrates is difficult without distorting the substrate at the smoothing station, where the substrate travels in a free span between idler rollers. Any distortions cause non-uniformities in coating thickness, wound-in stresses, and related defects that degrade the performance of advanced magnetic tape products. This is true for both the magnetic coatings and the backside coatings, some of which use carbon-black particles in a binder system to improve conductivity, runnability, air bleed, winding properties, and other properties. There is a need to manage substrate instabilities at the point of smoothing and several improved versions of drag smoothers are known.

In one version, the drag smoother is a trailing flexible blade which is pre-tensioned before being clamped in the smoothing assembly so that the originally straight edge of the film becomes puckered or bowed in the cross-web direction, as discussed in U.S. Pat. No. 08/293,481, filed on Aug. 22, 1994 by the assignee of this invention. The back-up smoothing bar is a flat, rigid, rectangular plate, with an outer edge which is straight and undeformable perpendicular to the direction of web travel. To achieve bowing and attenuate web wrinkles or flutter, a second, curved flexible film 28 is used. The resulting shape imparts tension variations on the substrate that flatten out the tension troughs which thin polyester films and other tensioned substrates tend to form between two idler rolls. This improves smoothing quality. Although very effective for conventional magnetic tape products on polyester substrates thicker than 10–12 microns, the puckered film method does not produce the desired results on thin products with substrate thicknesses of 8 microns or less.

In another drag smoother discussed in U.S. Pat. No. 5,447,747, a flexible polyester film with a curved edge is placed between a rigid back-up plate and a smoothing film, both having straight edges, or is clamped on top of the rigid back-up plate. In either configuration, the curved edge bows the smoothing film toward the web in the center and reduces substrate buckling, even on substrates between 4 and 8 microns thick. A drawback of this system is its inability to readily accommodate different amounts of bowing. The optimal amount of bowing depends on coating conditions such as coating thickness, speed, and viscosity, on substrate properties such as thickness and modulus, and on variations in substrate quality from roll to roll.

Japanese Reference 50-22835 discusses smoothing wet coatings of magnetizable particles that have been applied by gravure coating. It discusses smoothing sheets of plastic film, with the working edges either curved or straight except for diagonal corners. Both types improve smoothing compared to a rectangular sheet. This reference concludes that thinner smoothing sheets are more effective because a thinner smoothing sheet makes better contact with the coated backing member. These configurations seek to cause tension variations and may be equally effective in flattening the substrate at the point of smoothing. A major drawback, however, is the need to cut the polyester film into curved or slanted shapes, which is prone to cause burrs or other edge defects which can produce streaks and other coating flaws.

U.S. Pat. No. 4,547,393 discloses a flexible sheet for smoothing a coating of highly viscous solution. A flexible sheet smoothes while the coating is subjected to a magnetic field. The flexible sheet is from 4 to 120 microns thick. The flexible sheet can be mounted on a pedestal whose position prevents longitudinal lines or streaks from forming on the sheet. When the flexible smoothing sheet is mounted on a roll, the contact area of the sheet at the smoothening area can be adjusted by turning the roll and preventing longitudinal lines or streaks occurring on a sheet by adjusting the contact area.

U.S. Pat. No. 4,870,920 uses a rigid smoothing bar to smooth wet coatings of magnetizable particles. A stiff bar-shaped or deformable plate-shaped member having a smooth surface is used. It also describes using a combination of the flexible sheet and bar.

These last two patents fail to explicitly address stabilizing thin gauge substrates at the point of smoothing. U.S. Pat. Nos. 4,995,339 and 5,042,442 use an air nozzle system or crowned idler rollers to stabilize thin substrates traveling over fluid-bearing coating dies. While these concepts may be applicable to smoothing with a flexible, trailing blade, they are very complex and not very flexible.

Japanese Reference 60-57387 uses a solid body smoother 3 to smooth wet coatings of magnetizable particles.

SUMMARY OF THE INVENTION

This invention continuously smoothes a wet coating on a longitudinally moving substrate. The apparatus includes a flexible film having first and second transverse ends, a first longitudinal end, and a second longitudinal end. The second longitudinal end is secured. The first longitudinal end is held in contact with the wet coating on the substrate and drags against the wet coating. The flexible film deflects to form an arc between the second longitudinal end and a contact point of the first longitudinal end and the coating. The film adjacent the first longitudinal end deflects toward the substrate along a line extending between the first and second transverse ends. The amount of deflection is adjustable and variable during coating to adjust the radius of curvature of the first longitudinal end.

A back-up smoothing bar or a cylindrical rod, with or without a sharp edge, can hold the flexible film in position and press the film against the wet coating. The deflection and adjustment of the bar or rod can be performed by a single component, such as a screw, or by multiple components.

In an alternative embodiment, a cylindrical rod having first and second transverse ends is used without a flexible film.

The apparatus can be used for continuously smoothing a wet coating of magnetizable particles and binder on a web, as well as for backside coatings.

DETAILED DESCRIPTION

The improved smoothing device and method removes gravure patterns such as those created with magnetic dispersion coatings and with backside coatings with carbon-black particles and binder on thin gauge polyester substrates. A flexible polyester film is wrapped around a back-up blade to remove the gravure pattern, as in standard "drag-smoothing" technology. Instead of a conventional, plate-like back-up blade, a flexible rod that can be bowed and adjusted on-line, adjusts to eliminate or minimize cross-web buckling instabilities of the substrate. This improves the gravure-coating quality of layers, such as thin magnetic layers, on thin substrates, such as very thin polyester substrates 3–8 microns thick.

Figure 1:
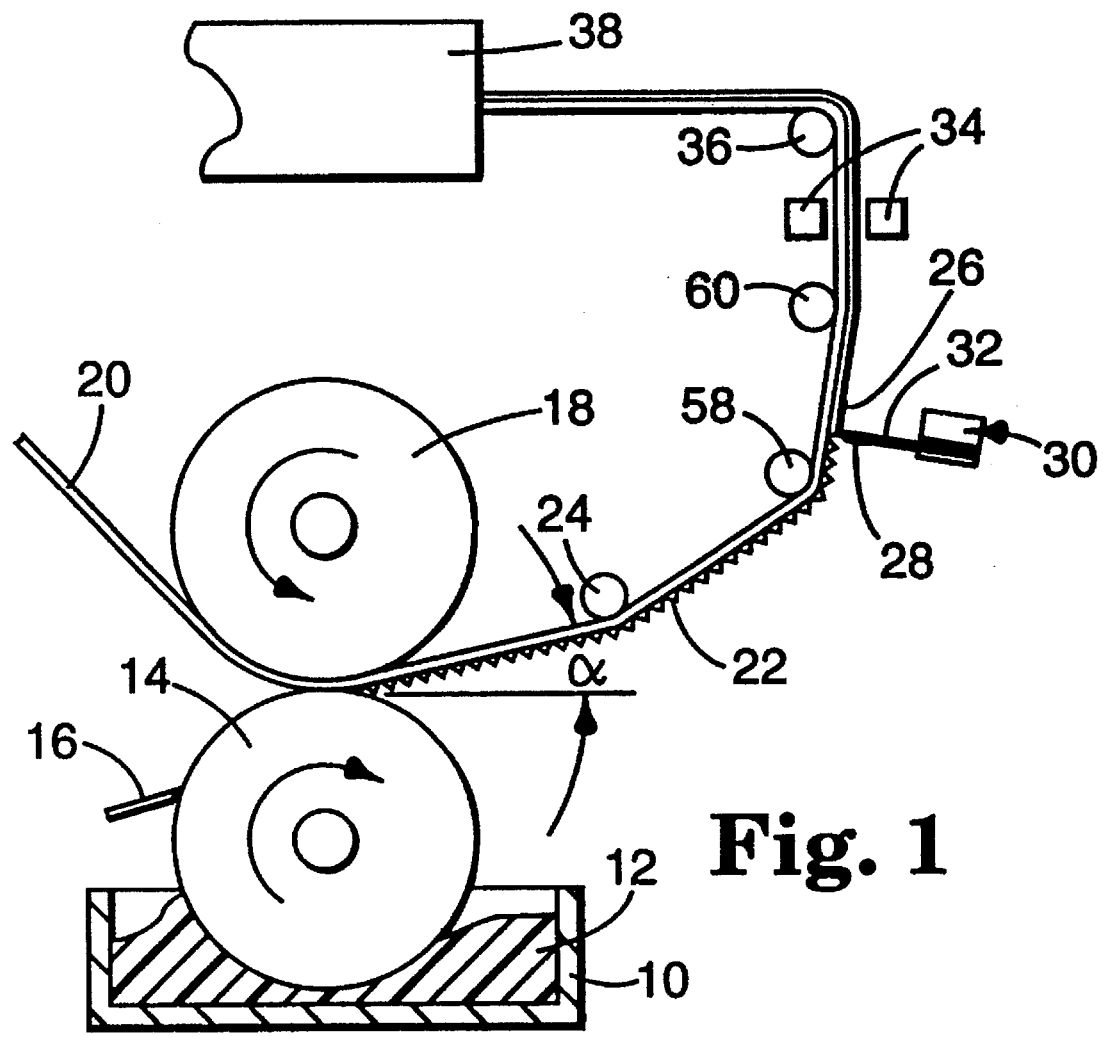
FIG. 1 is a schematic view of a direct gravure apparatus for continuously applying a coating to a web using a smoothing blade of the invention.

Referring to FIG. 1, a pan 10 of a direct gravure coater is continuously supplied with a fluid dispersion 12 of magnetizable particles and binder. The dispersion is picked up in the fine grooves of a gravure roll 14 which is scraped by a doctor blade 16 so that substantially the only material left is that contained in the grooves. A resilient roll 18 presses a flexible web 20 against the gravure roll 14 which drives the resilient roll 18 and web 20 at the same speed and in the same direction as the gravure roll 14. Consequently, a wet coating 22 (the pickout) is deposited onto the web 20 in a mirror pattern of the gravure grooves.

Figure 2:
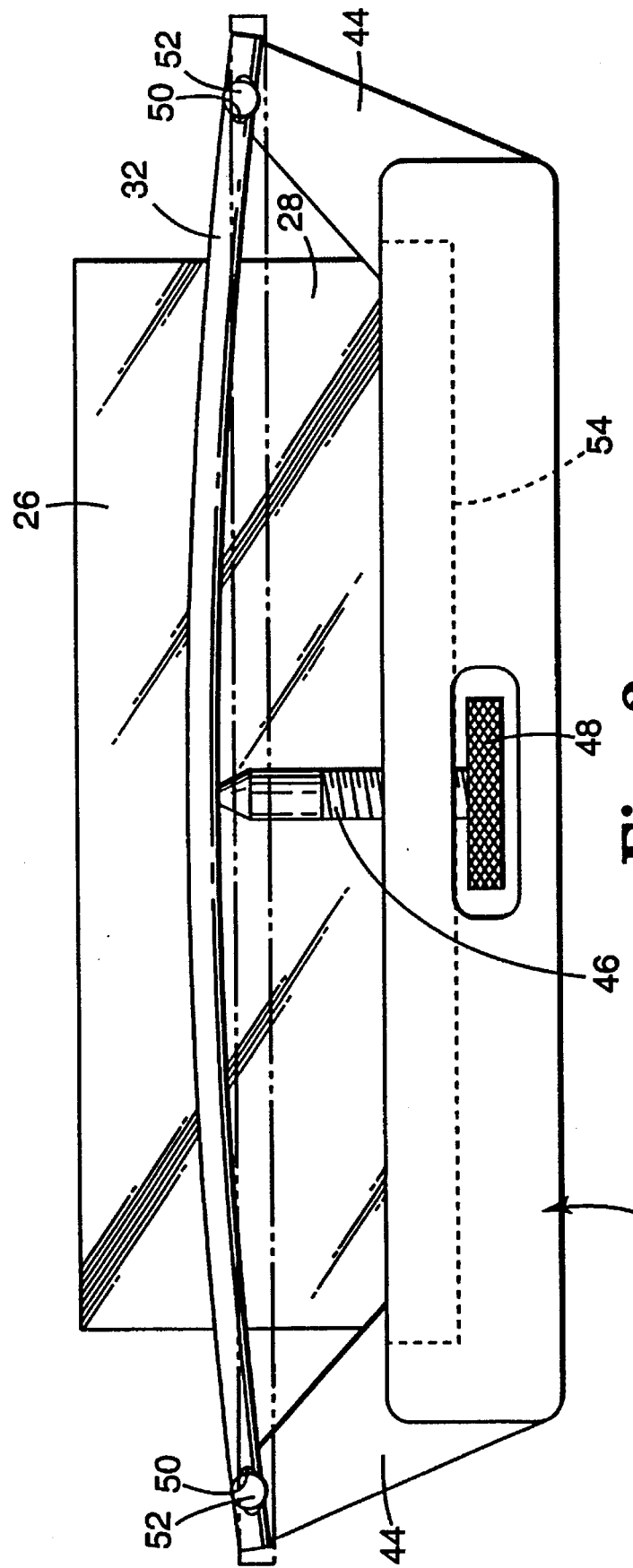
FIG. 2 is a top view of the smoothing blade of FIG. 1.
Figure 3:
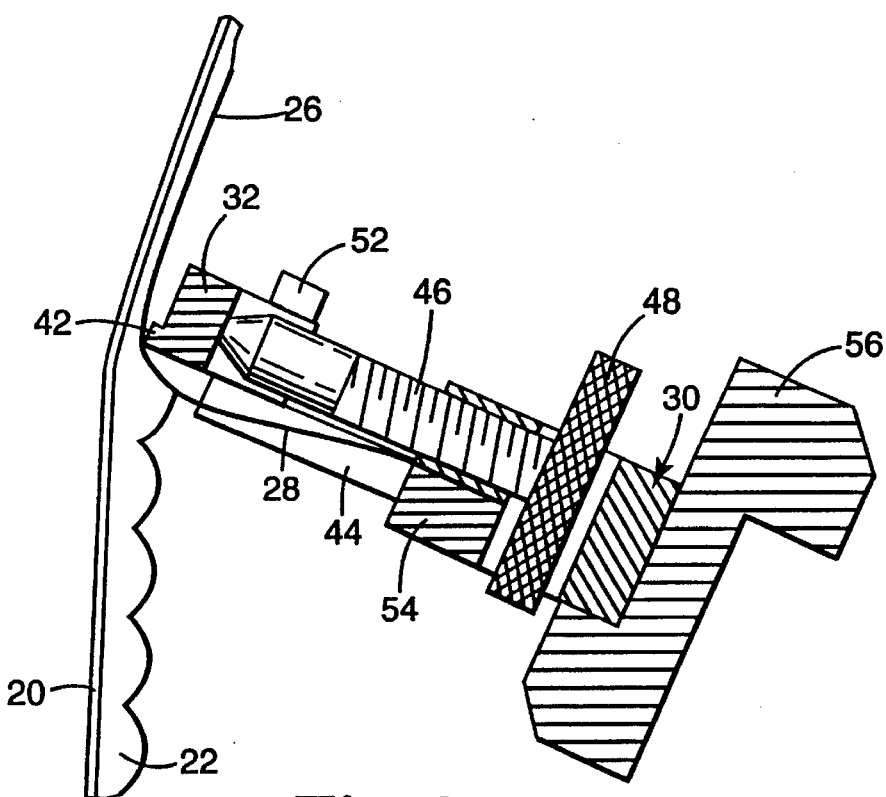
FIG. 3 is a cross-sectional view of the smoothing blade of FIG. 2.

As shown, the web 20 moves substantially horizontally as it emerges from the nip between the gravure roll 14 and the resilient roll 18. Next, its uncoated face contacts a take-off idler roll 24, which is vertically adjustable to provide a take-off angle α of from −20°' to 45° degrees to a line perpendicular to a line connecting the centers of the gravure roll 14 and the resilient roll 18. Minor defects in pickout can sometimes be eliminated by small adjustments in the take-off angle α. Before significant evaporation of the volatile vehicle in the coating, the wet coating pattern is smoothed by the trailing portion 26 of a flexible smoothing film 28 that extends across the full width of the coating. The other end of the flexible film is secured by a smoothing assembly 30 (FIGS. 2 and 3). The coated web 20 passes between magnets 34 to physically align the magnetizable particles and the web is overdriven by a pull roll 36, creating a back tension in the web 20. The web 20 then passes through an oven 38 to dry the coating.

As shown in FIG. 3, the smoothing film 28 is pressed against the web 20. A back-up smoothing bar 32 having a protruding outer edge 42 is held, such as by clamping, by two supports 44 connected to the smoothing assembly 30. In its unloaded state, the outer edge 42 is straight. The film 28 can have a thickness of 3–5 mils and extend about 0.25–1.5 inch (0.63–3.81 cm) past the bar. The edge 42 of the bar promotes a clean separation of the sheet from the bar.

During operation, the smoothing bar 32 is loaded by a precision screw 46. The screw 46 has a large knob 48 to allow easy and quick on-line adjustment of the amount of bowing. Deflection can be measured in mils using a dial indicator or similar device. Deflection of the back-up bar 32, although shown as perpendicular to the undeflected web path, can be perpendicular to the web path, parallel to the web path, or at any angle in between. When loaded, the edge 42 assumes a curved or "bowed" shape (shown in FIG. 4). The smoothing assembly 30 presses the film 28 against the wet layer on the web 20. This causes the film to form a converging arc-shaped wedge with the web 20 and allows the trailing portion 26 to drag against the wet coating on the web.

In the illustrated embodiment, the screw 46 is used, but other adjustable loading devices, including multiple screws, can also be used. To allow free bowing over the entire coating width, the smoothing bar 32 has slots 50 where it is secured with shoulder bolts 52 to supports 44. A clamping piece 54 holds the flexible film 28 against the assembly 30. After the assembly 30 is first put together, the film is essentially flat and its trailing portion 26 is parallel to the unloaded smoothing bar 32. This results in a more curved shape near the ends upon loading in the center, which improves the effectiveness of the smoother. The effectiveness of this modified design was demonstrated in tests in which 12-inch, 18 gauge tape was coated with 16 microinch thickness backside coating without any significant down-web striations.

The smoothing assembly 30 is connected to a mount 56 that is adjustable during smoothing with micrometer precision. It is adjustable horizontally and vertically, and is pivotable while keeping the clamp 54 for the film 28 substantially parallel to and across the wet coating 22. Small adjustments in position or angle permit an operator to adjust the radius of curvature of the arc-shaped wedge portion of the flexible film where the film bends around the edge 42 of the smoothing bar 32.

In the smoothing assembly shown in FIG. 3, the outer edge 42 is sharp, slightly rounded, or chamfered in the direction of web travel, and has no substantial effect on the radius of curvature the flexible film assumes as it is being bent. Instead, the radius of curvature results from the mechanical and hydrodynamic forces that act on the flexible film which, in turn, changes in response to operator adjustments of position or angle of the mount 56.

Such an adjustment can prevent the recurrence of defects that may appear in the smoothed coating. Preferably, the operator can adjust the position of the straight edge to change the radius of curvature to be from 0.03 to 0.5 inch (0.075 to 1.25 cm). If the radius of curvature were substantially less than 0.03 inch (0.075 cm), the flexible film might skive off part of the coating 22. On the other hand, if the radius of curvature were substantially greater than 0.5 inch (1.25 cm), the wet coating might not be smoothed to be substantially free from imperfections.

The trailing portion 26 of the flexible film 28 should drag against the wet coating over a length of from 0.25 to 30 inches (0.6 to 75 cm). Preferably, the drag length is from 0.5 to 2 inches (2 to 5 cm). Below that range, there is a danger that the film might not smooth the coating to have uniform thickness and to be substantially free from imperfections. Above that range, the drag might be so great to produce an undesirably large drop in tension in the web 20 upstream of the smoothing bar 32.

Figure 4:
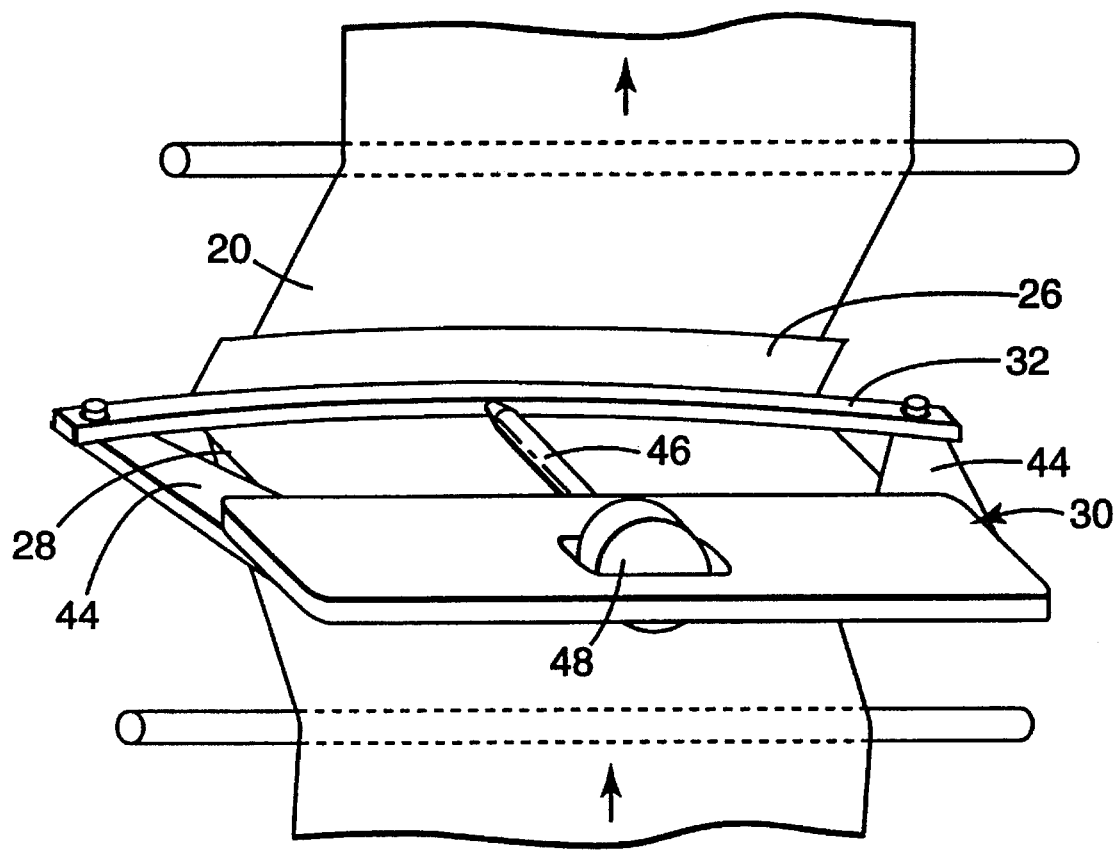
FIG. 4 is a perspective view of the smoothing blade, when bowed, in operation.

FIG. 4 shows a perspective view of a bowed smoothing bar in operation. Bowing of the smoothing bar 32 substantially reduces and can completely eliminate wrinkles and flutter in the web 20 as it travels over the trailing portion 26. This avoids or at least minimizes coating nonuniformities related to web wrinkles and flutter. This is more effective in attenuating web wrinkles or flutter, especially toward the edges of the web, than non-adjustable systems. The benefits of a bowed smoothing bar are especially important when the coating is wide (wider than 15 cm) or when the web is thin (thinner than 12 micron). Compared to non-adjustable bowed smoothing bars, a major advantage of the adjustable bowed smoothing bar is that a skilled operator can readily adjust on the fly the amount of bow to achieve optimal coating quality for web rolls of varying quality or thickness.

The take-off idler roll 24 redirects the web across the span between an upstream idler roll 58 and an downstream idler roll 60 (FIG. 1). Preferably, the web travels from 0.25 to 6 inches (0.6 to 15 cm) between the upstream idler and the line along which the flexible film 28 first contacts the wet coating. If that distance were much less than 0.25 inch (0.6 cm), imperfections of the upstream idler might introduce imperfections into the wet coating 22. If that distance were much greater than 6 inches (15 cm), the web might not be adequately supported where it is contacted by the trailing portion 26 of the flexible film 28, which could reduce the lateral thickness uniformity of the coating 22. For the same reason, the span between the upstream and downstream idlers should not exceed 50 inches (125 cm), but should be at least 1.5 inches (4 cm).

On-line adjustability permits quick changes in the amount of bow to accommodate instantaneous changes in process conditions or substrate properties. The adjustable smoother also greatly accelerates the experimental procedures needed to establish the optimal amount of bow for a given application. The adjustable smoother allows imparting bow onto the smoothing film all the way out to the edges, which improves performance as compared to a flexible curved back-up film which imparts little force at the edges. Moreover, the edge around which the smoothing film bends can be machined to any geometry to improve performance. Indeed, the flexible rod itself, if properly shaped and equipped with a sharp edge, could be used as a "rigid" smoothing device without any trailing polyester film. The short contact lengths and resulting small tension drops that such a device makes possible could improve smoothing performance on ultra-thin substrates, which tend to break when handled under conventional, high tensions.

In tests, running the flexible smoother of this invention in a bowed rather than in a straight mode significantly reduced down-web coating striations resulting from substrate distortions. It also greatly reduced and almost eliminated coating quality degradations in the cross-web direction resulting from core impressions of the adhesive tape that is used to attach the polyester film onto the core.

Figure 5:
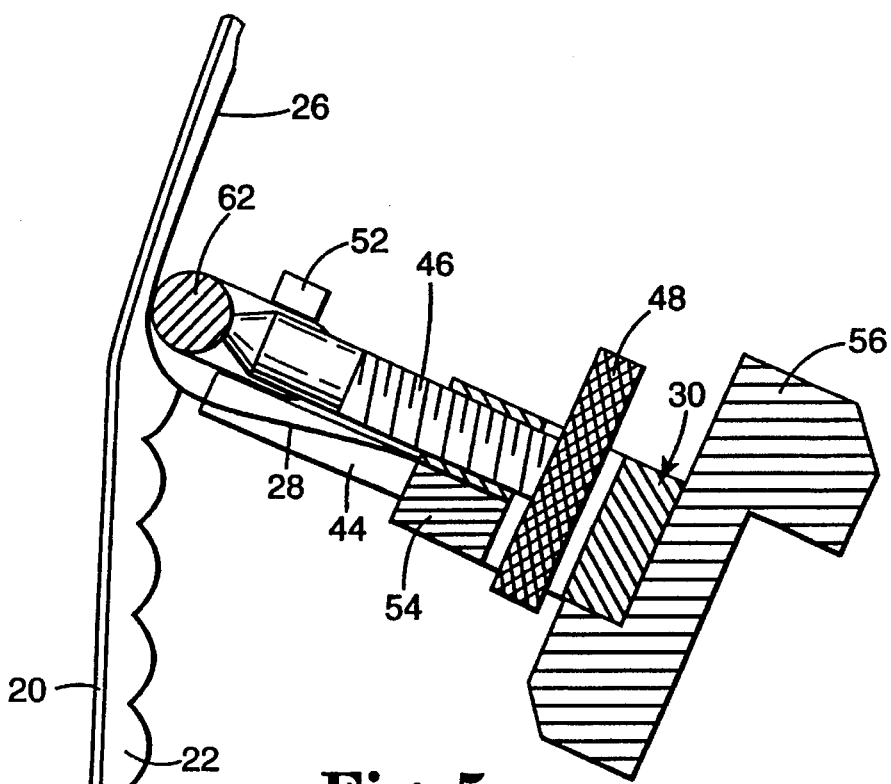
FIG. 5 is a cross-sectional view of another embodiment of the smoothing blade.

In the smoothing assembly of FIG. 5, the back-up smoothing bar is a circular rod 62. The radius R is chosen to limit the amount of curvature the flexible film 28 can assume where it bends around the smoothing bar. The radius R can range from 0.05–1 inch (0.0.127 –2.54 cm), such as from 0.125 to 0.5 inch (0.317 –1.27 cm). Limiting the radius of curvature can widen the range of positions and angles of the mount 56 at which the smoothing blade produces coatings of superior quality, especially for thin webs (thinner than 12 microns), and hence makes the process less sensitive to operator skill and experience. On the other hand, the radius may have to be modified to accommodate substantially different coating process parameters. Large radii are favored for low coating speeds, high web tensions, and low viscosities, and small radii for opposite trends.

Figure 6:
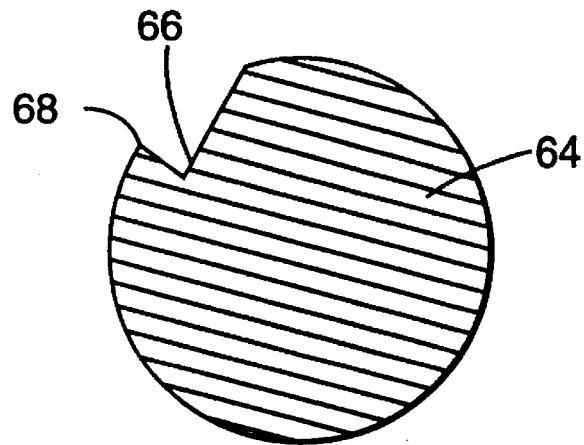
FIG. 6 is a cross-sectional view of a rod which can be used with the smoothing blade of FIG. 6.
Figure 7:
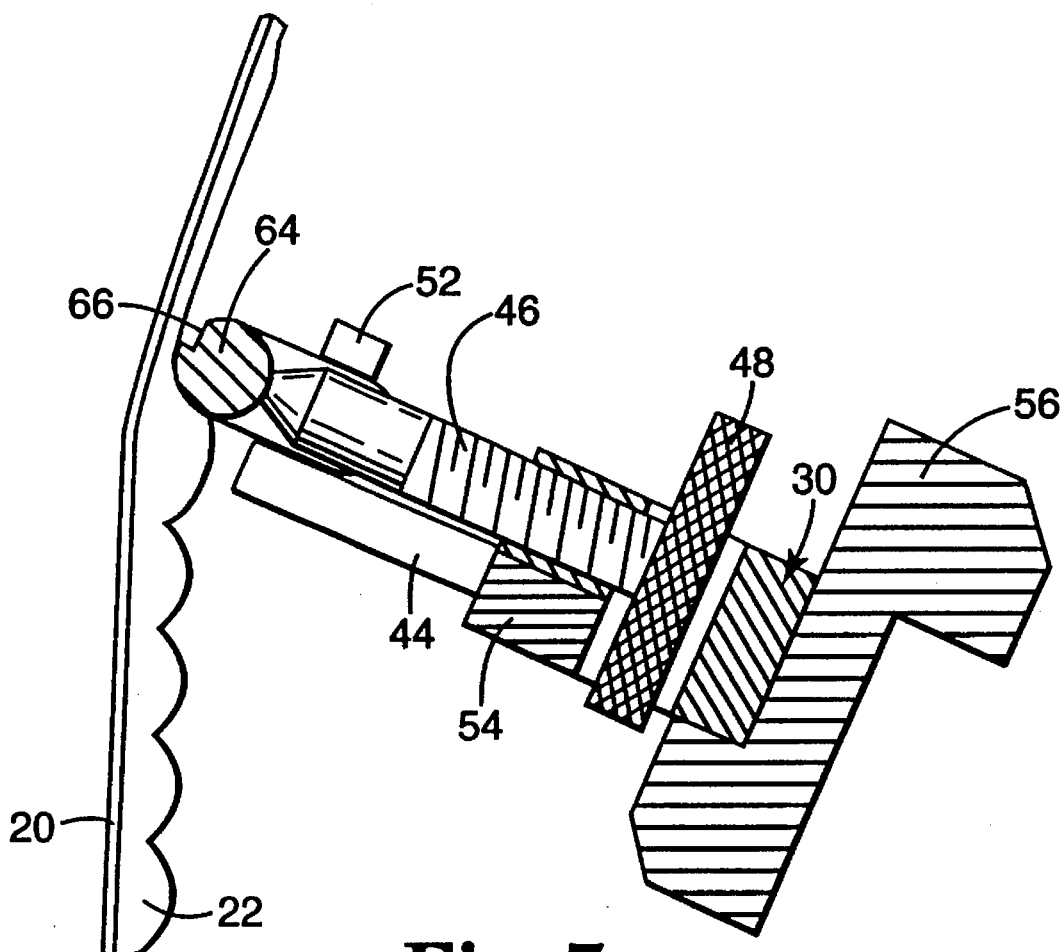
FIG. 7 is a cross-sectional view of another embodiment of the smoothing blade.

In the smoothing assembly in FIG. 7 a circular rod 64 with a notch 66 cut into it, producing a sharp corner 68, as shown in FIG. 6, performs the smoothing task without any flexible film wrapped around and trailing past it. In this configuration, the wet contact length between the stationary smoothing device and the moving coating layer can be made short. Hence, the tension drop imparted onto the web by viscous shear stresses in the coated layer becomes very small. A small tension drop allows coating at very low tensions which may be required to transport very thin webs without wrinkles, chatter, or buckling.

Figure 8:
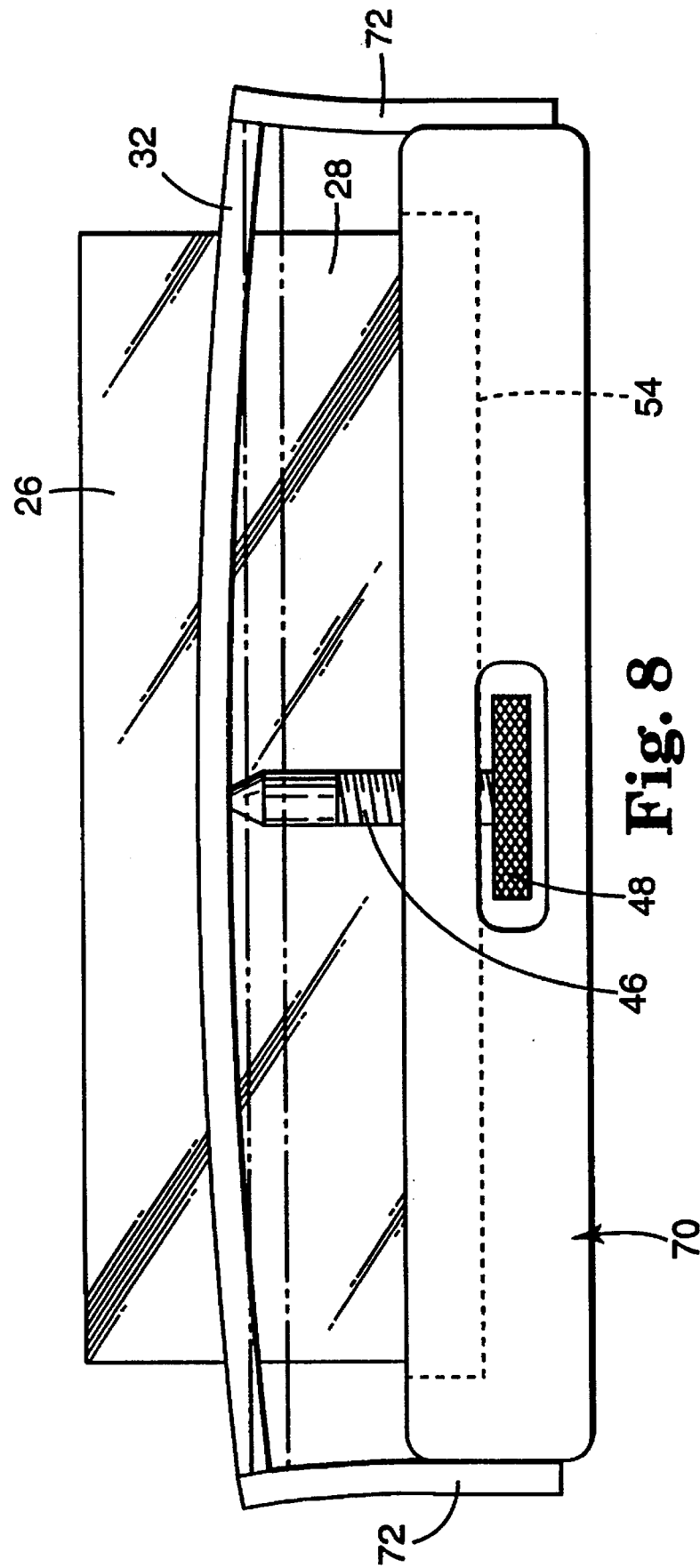
FIG. 8 is a top view of another embodiment of the smoothing blade.

The smoothing assembly 70 of FIG. 8 relies on two fairly thin and flexible supports 72 to accommodate bending the smoothing bar 32 as the set screw 46 pushes it out. These supports 72 constrain the smoothing bar 32 bowing near its ends. The supports 72 also prevent the bar from rotating while allowing flexing when the bar is loaded at its center.

The flexible adjustable smoothing blade provides on-line adjustability, accommodating changes in web flatness or process conditions. It bows all the way out to the margins, allowing the manufacture of large coating widths, and permitting coating to the edges. It also allows a wide range of geometries for the back-up blade, expanding the operating window. The flexible smoothing blade can provide a bowable "rigid" smoother without a trailing polyester film, reducing the tension drop for thin gauge webs.

We claim:

1. An apparatus for continuously smoothing a wet coating on a longitudinally moving substrate comprising:

a flexible film having first and second transverse ends, a first longitudinal end, and a second longitudinal end, wherein the second longitudinal end is secured and the first longitudinal end is free to drag against the wet coating on the substrate to cause the flexible film to form an arc between the second longitudinal end and a contact line of the flexible film and the coating:

means for holding the second longitudinal end of the flexible film;

flexible means for deflecting the film adjacent the first longitudinal end toward the substrate and in a direction generally perpendicular to the plane of the substrate, along a line extending between the first and second transverse ends;

means for adjusting and varying the amount of deflection adjacent the first longitudinal end during the coating of the substrate to adjust the radius of curvature of the deflection along the line extending between the first and second transverse ends; and means for holding the flexible film in contact with the wet coating on the substrate:

wherein the contact line is located between the first longitudinal end and the second longitudinal end.

2. An apparatus for continuously smoothing a wet coating on a longitudinally moving substrate comprising:

a flexible film having first and second transverse ends, a first longitudinal end, and a second longitudinal end, wherein the second longitudinal end is secured and the first longitudinal end is free to drag against the wet coating on the substrate to cause the flexible film to form an arc between the second longitudinal end and a contact line of the flexible film and the coating;

means for holding the second longitudinal end of the flexible film;

means for supporting the substrate in a free span while the flexible film contacts the coating;

flexible means for deflecting the film adjacent the first longitudinal end toward the substrate and in a direction generally perpendicular to the plane of the substrate, along a line extending between the first and second transverse ends;

means for adjusting and varying the amount of deflection adjacent the first longitudinal end during the coating of the substrate to adjust the radius of curvature of the deflection along the line extending between the first and second transverse ends; and means for holding the flexible film in contact with the wet coating on the substrate.

3. The apparatus of claims 1 or 2 wherein the deflecting means comprises a flexible smoothing bar.

4. The apparatus of claims 1 or 2 wherein the deflecting means comprises a flexible cylindrical rod.

5. The apparatus of claim 4 wherein the cylindrical rod is formed with a cutout portion and a sharp edge.

6. The apparatus of claims 1 or 2 wherein the deflecting means and the adjusting means are a single component.

7. The apparatus of claim 6 wherein the single component comprises a screw.

8. The apparatus of claims 1 or 2 which is for continuously smoothing at least one of a wet coating of magnetizable particles and binder and a backside coating with carbon-black particles and binder on a flexible elongated web.

9. The apparatus of claim 1 wherein the adjusting means permits adjusting the curvature over the entire distance between the transverse ends.

10. The apparatus of claim 9 further comprising a bolt and slot connection which supports ends of the deflecting means.

11. An apparatus for continuously smoothing a wet coating on a longitudinally moving substrate comprising:

a flexible cylindrical rod having first and second transverse ends;

means for supporting the substrate in a free span while the cylindrical rod contacts the coating;

means for deflecting the rod toward the substrate and in a direction generally perpendicular to the plane of the substrate, along a line extending between the first and second transverse ends;

means for adjusting and varying the amount of deflection during the coating of the substrate to adjust the radius of curvature of the deflection of the rod along the line extending between the first and second transverse ends.

12. The apparatus of claim 11 wherein the cylindrical rod is formed with a cutout portion and a sharp edge.

13. The apparatus of claim 11 wherein the adjusting means permits adjusting the curvature over the entire distance between the transverse ends.

14. The apparatus of claim 13 further comprising a bolt and slot connection which supports ends of the deflecting means.

* * * * *